May 9, 1933.  L. H. KAUPKE  1,908,255
FERTILIZER ATTACHMENT
Filed July 15, 1931   2 Sheets-Sheet 1
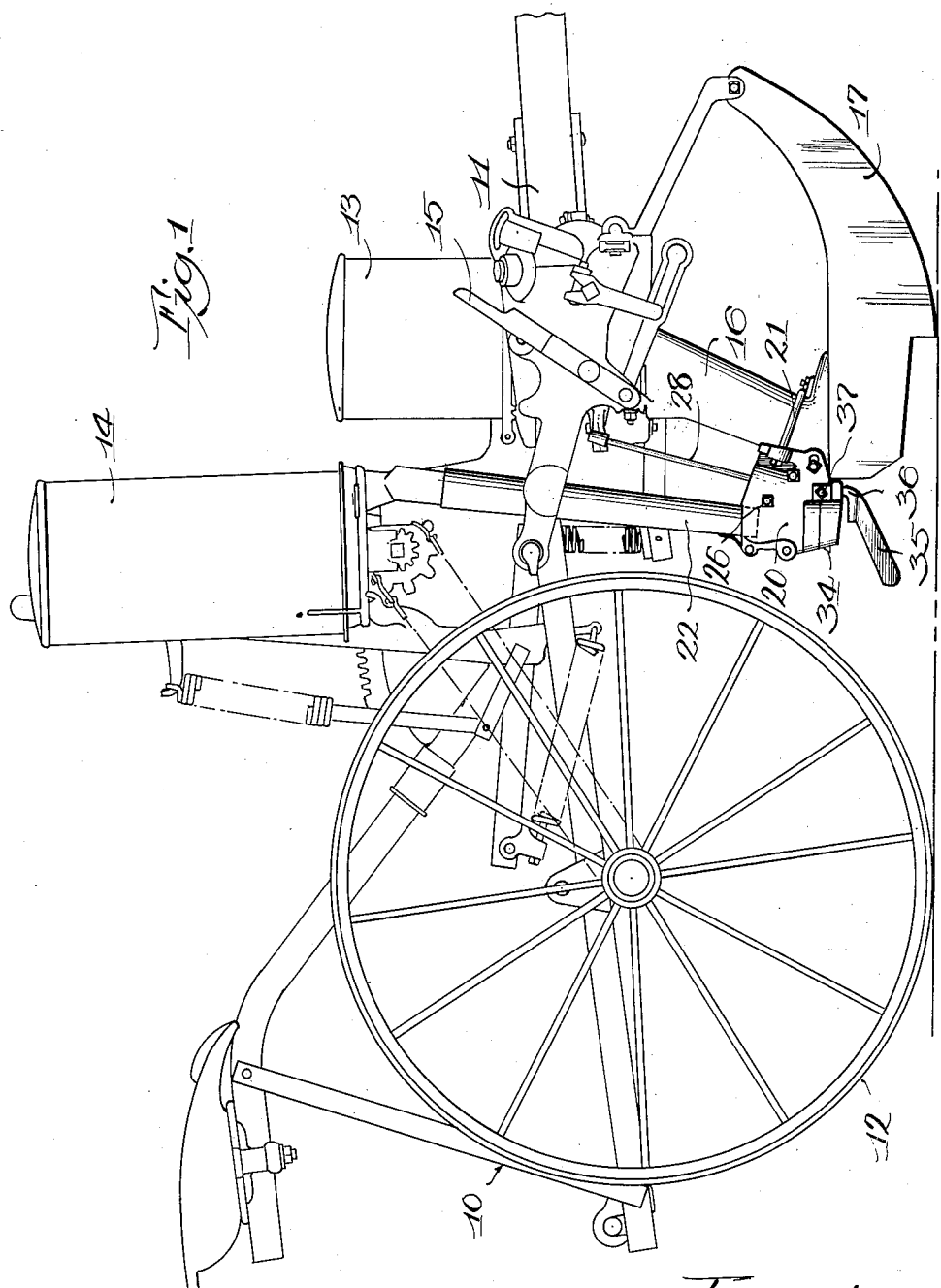
Inventor
Lee H. Kaupke May 9, 1933.  L. H. KAUPKE  1,908,255
FERTILIZER ATTACHMENT
Filed July 15, 1931   2 Sheets-Sheet 2
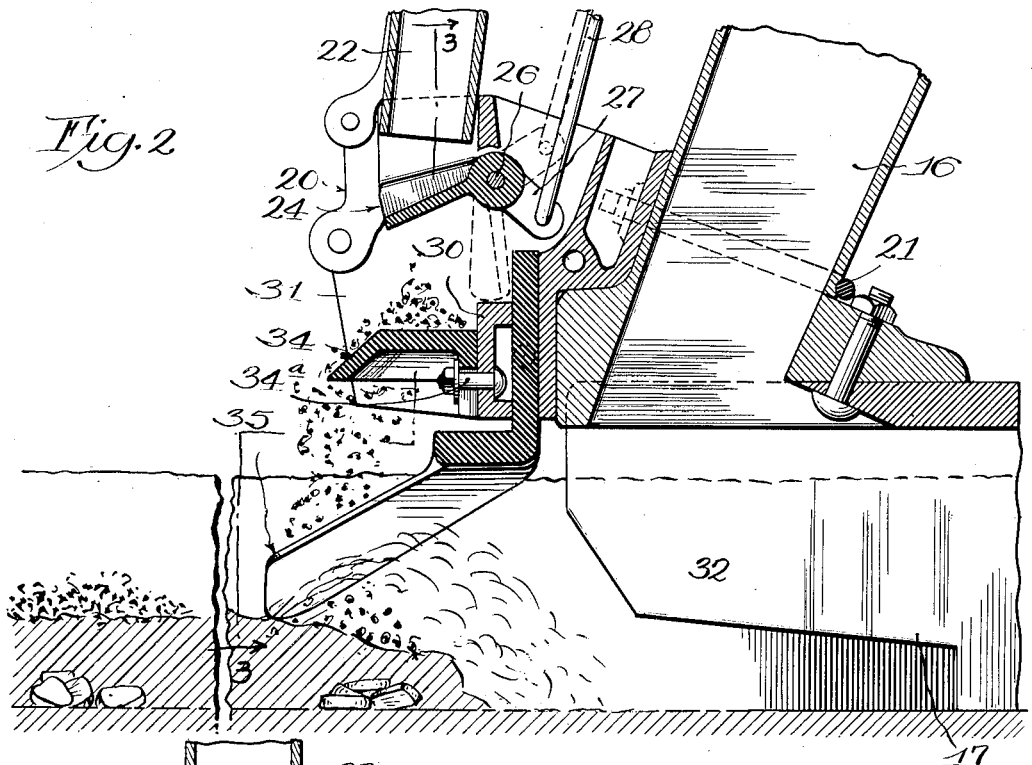
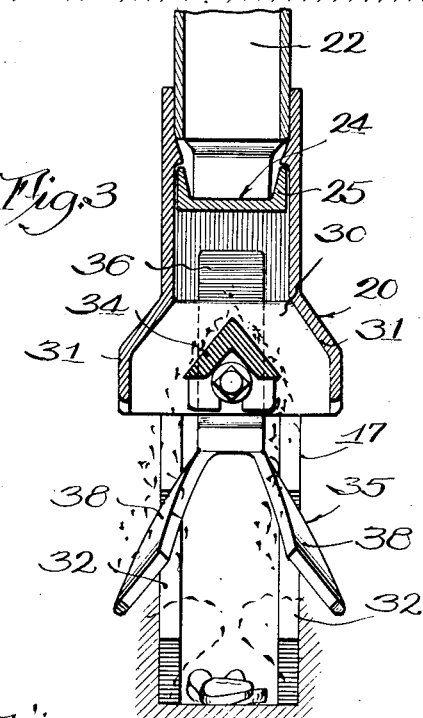
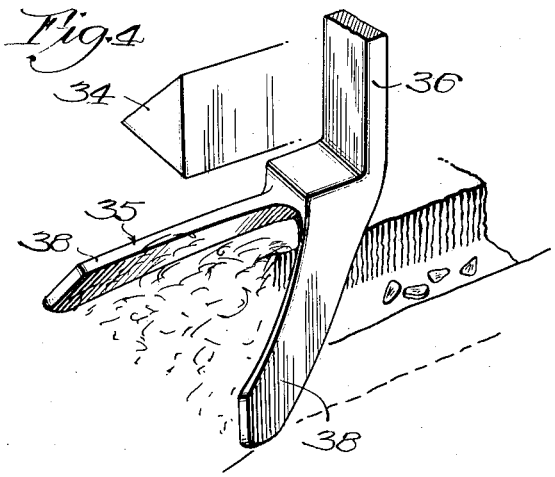
Inventor,
Lee H. Kaupke, Patented May 9, 1933

1,908,255

UNITED STATES PATENT OFFICE

LEE H. KAUPKE, OF ROCK ISLAND, ILLINOIS, ASSIGNOR TO ROCK ISLAND PLOW COMPANY, OF ROCK ISLAND, ILLINOIS, A CORPORATION OF ILLINOIS

FERTILIZER ATTACHMENT

Application filed July 15, 1931. Serial No. 550,840.

This invention relates to improvements in fertilizer attachment for planters, and has for its principal object to provide an improved construction for devices of the character described.

Many attempts have been made to provide means for depositing fertilizer in close juxtaposition to mechanically planted seed so as to get the maximum benefit from the fertilizer, but at the same time protecting the seed from actual contact by the fertilizer.

In carrying out my invention, I provide an improved construction of fertilizer attachment of the general type previously utilized in connection with automatic planters, but including an improved soil turning device which insures the covering of the seed with a thin layer of soil so as to space the fertilizer from the seed, and yet permits the depositing of the fertilizer in close proximity thereto.

My improved device is adapted for use in a wide variety of soils, and is particularly designed so as to avoid clogging or "balling up" by collection of soil, roots, fibers and rubbish thereon, which heretofore has been a constant source of trouble in attempts to operate fertilizing devices under practically all operating conditions.

My invention is best understood by reference to the accompanying drawings in which Figure 1 is a side view of a planter of a standard form provided with my improved form of fertilizing attachment.

Figure 2 is an enlarged view in longitudinal section of the fertilizing device showing also part of the rear end of the seed-depositing chute and runner opener.

Figure 3 is a section as taken on line 3—3 of Figure 2.

Figure 4 is a detail view of my improved form of covering attachment forming one of the principal features of my invention.

Referring now to details of the apparatus shown in the drawings, 10 indicates a planter of standard construction, having a frame 11, ground wheels 12, seed can 13, and fertilizer can 14. The seed can 13 shown herein is provided with an automatic planting mechanism including a trip lever 15 which is adapted to co-operate with spacing wires for check row planting in the usual manner. It will be understood, however, that my device is not limited to an automatically operated planting device, but the planting may be controlled by hand if desired.

The seed can 13 is provided with a delivery chute 16 communicating with the rear end of a runner opener 17 in the usual manner, it being understood that the seeds are deposited in the chute 16 from the seed can at suitably spaced intervals, as controlled by operation of the trip lever 15 or its equivalent, in the usual manner. Details of this seed delivery mechanism need not be disclosed as the construction is well understood in the art.

The fertilizer attachment constitutes a housing 20, herein connected to the lower end of the seed chute 16, at the rear, by suitable means such as a U-bolt 21. A fertilizer chute 22 extends downwardly to the upper part of the housing from the fertilizer can 14. A fertilizer valve 24 is mounted in the housing below the fertilizer chute 22, which valve consists of a plate 25 hinged at its forward edge on pin 26 and provided with an operating lever 27 connected by link 28 to the seed-planting mechanism, so as to be operated simultaneously therewith in the usual manner.

The housing 20 is provided with a bottom and rearwardly opening discharge passage defined by front wall 30 and side walls 31, 31, the side walls preferably being flared outwardly beyond the spased blades 32, 32 of the runner opener 17, as indicated in Figure 3. The lower margins of the front and side walls 30 and 31 are normally disposed slightly above the operating level of the runner opener which, in the form shown, is substantially at the same level as the lower end of the seed chute 16, as shown in Figure 2.

Within the housing and attached to the front wall thereof I provide an inverted V-shaped spreader member 34 which extends rearwardly beneath the fertilizer valve 24 in such position as to spread the fertilizer laterally and rearwardly as it is discharged from said valve. Said spreader member 34 may be detachably mounted by means of bolt 34a so as to facilitate cleaning of the interior of the housing.

In connection with the housing and parts thereof above described, I provide a soil-turning device indicated generally at 35, which consists of a shank 36, adjustably supported for vertical movement in the front end of the housing 20 by means of a set screw 37 (see Fig. 1). At the lower end of said shank is connected a pair of forked blades 38, 38 which are inclined downwardly and rearwardly on their longitudinal axes, and diverge in such position as to engage the opposite upper margins of the furrow previously formed by the runner opener. The two blades are also inclined downwardly and outwardly along their minor axes, so as to turn a part of the soil at the upper margins of the furrow inwardly as the planter advances, as is best shown in Figures 3 and 4.

I also find it desirable to form the blades 38, 38 with rounded or blunt lower edges throughout their length, as distinguished from a sharpened or cutting edge, inasmuch as a rounded or non-sharp edge succeeds in throwing off fibrous materials such as roots, grass, etc., whereas a sharper edge has a tendency to catch and collect roots and rubbish so as to destroy the usefulness of the device. It is also desirable to separate the blades close to the shank 36, rather than closing the space between them for any appreciable horizontal distance, thus avoiding a tendency to clog the operation of the device especially when operating in gummy soil.

The operation of the device above described is as follows:

The runner opener 17 forms a furrow in the soil in the usual manner as indicated in Figures 2 and 3 and operation of the planting mechanism causes the seed to be dropped through the chute 16 and deposited at intervals along the bottom of the furrow. As the planter advances, the blades 38, 38 project beyond the sides of the furrow so as to turn a portion of the sides thereof inwardly and cover the seed with a thin layer of soil.

Simultaneously with each operation of the seed-dropping mechanism, the fertilizer valve 24 is opened to deposit a single charge of fertilizer, but since the fertilizer is somewhat lighter and drops slower than the seed, the forward movement of the planter causes each charge of fertilizer to be deposited over the seed as indicated in the section at the left side of Figure 2, but separated from the seed by the thin layer of soil which has been previously turned inwardly thereover by means of the blades 38, 38. A ground wheel 12 of the planter then follows along the furrow in the usual manner so as to close the furrow over the fertilizer and complete the planting operation.

The housing 20 is arranged with its lower discharge opening closely adjacent the ground, thereby preventing the scattering of fertilizer when planting in a wind.

It will be noted that the work of turning the soil to protect the seed is done solely by the blades 38, 38, the housing 20 being normally above the level of the furrow. Said housing, therefore, does not form an obstruction which might have a tendency to collect soil or rubbish as is the case with certain fertilizer devices heretofore employed. This arrangement is also advantageous since the housing does not come in contact with moist soil which in other forms of fertilizer attachments has a tendency to clog and cake the fertilizer itself within the housing and interfere with the proper operation of the device.

The bottom and rear sides of the housing are open so as to permit cleaning of the interior of the housing when necessary, this cleaning also being facilitated by detachment of the spreader device 34.

The shape and arrangement of the blades 38, 38 is such as to turn the sides of the furrow inwardly over the seed slightly in advance of the fertilizer that is dropped over the side margins of the spreader member 34. At the same time the fertilizer is dropped over the sides of the spreader member 34 in substantially vertical alignment with the upper margins of the blades at their widened rear end portions, so as to be mixed and turned into the soil which is deposited immediately over the seed.

It will be found further that the blades are practically "self-cleaning", and thereby avoid clogging or "balling up" by the collection of gummy or sticky soil, or by the gathering of roots and other rubbish along their lower edges. My improved device is, therefore, capable of successful use in practically all types and conditions of soils in which a planter may be used.

Although I have illustrated and described the particular embodiment of my invention, it will be understood that I do not wish to be limited to the exact construction shown and described, but that various changes and modifications may be made without departing from the spirit and scope of my invention.

I claim as my invention:

1. A fertilizer attachment for planters, in combination with a furrow opener, a casing having a centrally disposed spreader therein forming a fertilizer discharge opening, and a soil turning member supported directly below said opening comprising two divergent blades inclined downwardly and rearwardly and arranged to turn soil inwardly along opposite sides of a furrow to cover seed deposited therein.

2. A fertilizer attachment for planters, in combination with a furrow opener, a casing having a centrally disposed spreader therein forming a fertilizer discharge opening, and a soil turning member comprising a shank supported for vertical adjustment directly below said opening and having two integral divergent blades inclined downwardly and rearwardly, and arranged to turn soil inwardly along opposite sides of a furrow to cover seed deposited therein.

3. A fertilizer attachment for planters, in combination with a furrow opener, a casing forming a fertilizer discharge opening, and a soil turning member supported directly below and between the lateral margins of said opening comprising two divergent blades inclined downwardly and rearwardly along their major axes and inclined downwardly and outwardly along their minor axes.

4. A fertilizer attachment for planters, in combination with a furrow opener, a casing having a centrally disposed spreader therein forming a fertilizer discharge opening, means normally supporting said casing above the operating level of the furrow opener, and a soil turning member supported directly below said opening comprising two divergent blades inclined downwardly and rearwardly immediately in advance of the superimposed side margins of said spreader and arranged to turn soil inwardly along opposite sides of a furrow to cover seed deposited therein.

5. A fertilizer attachment for planters, in combination with a furrow opener, a casing having a centrally disposed spreader therein forming a fertilizer discharge opening, and a soil turning member supported directly below and between the lateral margins of said opening comprising two divergent blades inclined downwardly and rearwardly immediately in advance of the superimposed margins of said spreader, said blades having blunt lower edges, and arranged to turn soil inwardly along opposite sides of a furrow to cover seed deposited therein.

Signed at Rock Island, Illinois, this 7th day of July, 1931.

LEE H. KAUPKE.